March 20, 1962 C. A. PETHYBRIDGE 3,026,101
HEAT-TREATING DEVICE
Original Filed Oct. 18, 1955 2 Sheets-Sheet 2

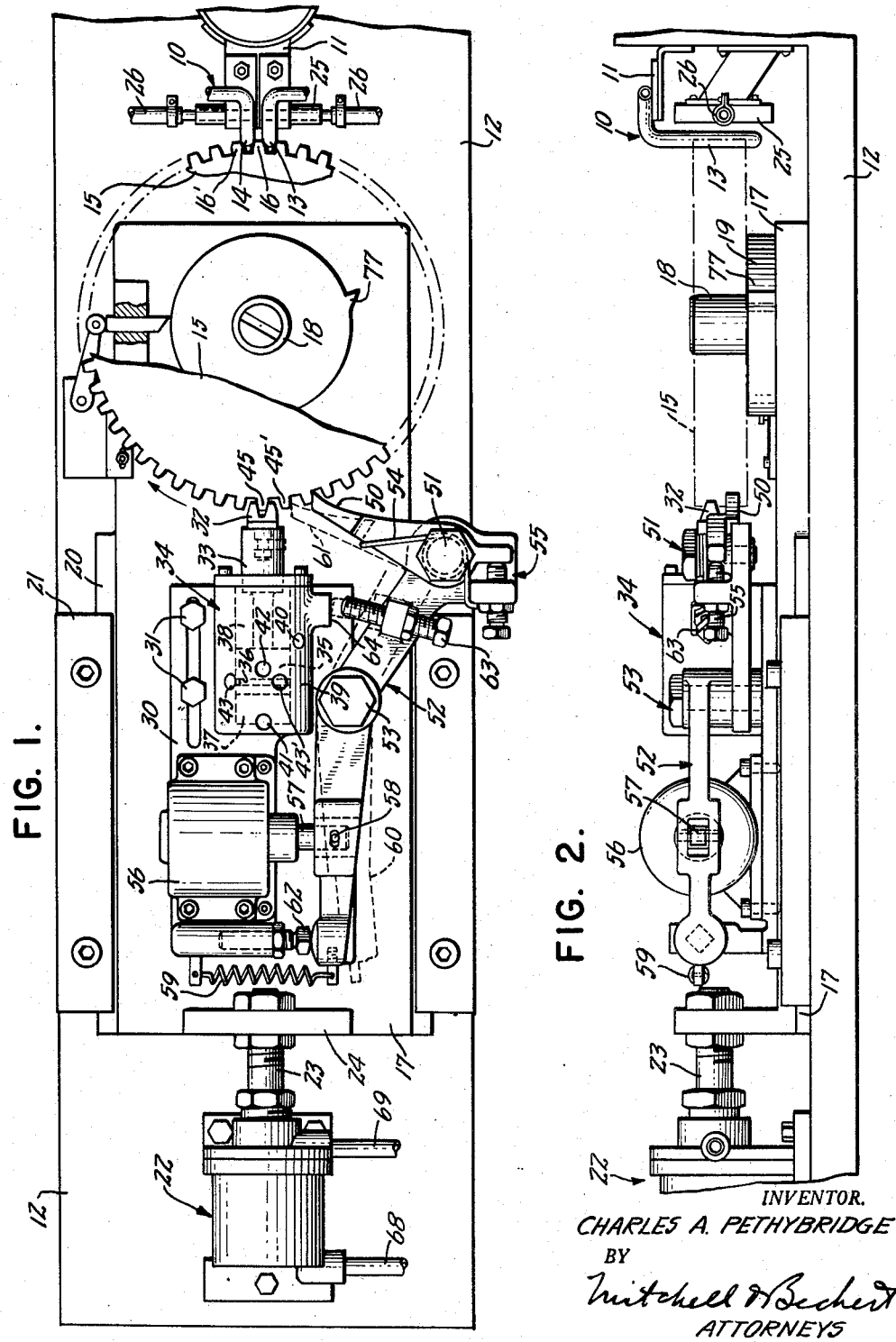

INVENTOR.
CHARLES A. PETHYBRIDGE
BY
Mitchell & Bechert
ATTORNEYS

United States Patent Office 3,026,101
Patented Mar. 20, 1962

3,026,101
HEAT-TREATING DEVICE
Charles A. Pethybridge, New Britain, Conn., assignor to The New Britain Machine Company, New Britain, Conn., a corporation of Connecticut
Continuation of application Ser. No. 541,209, Oct. 18, 1955. This application Dec. 24, 1958, Ser. No. 784,414
6 Claims. (Cl. 266—4)

My invention relates to a heat-treating device and in particular to an improved induction-hardening device for treating the teeth of a gear. This application incorporates improvements over and modifications of the structure disclosed in Gridley Patent 2,582,929 issued January 15, 1952, and is a continuation of application Serial No. 541,209, filed October 18, 1955, now abandoned.

In order better to understand the advantages of the invention over the conventional induction-hardening devices including the patent mentioned above, certain pertinent considerations involved in the process of induction-hardening should be understood.

First, it is important that the induction heating element or loop be placed as close as practically possible to the region of the gear tooth being heat treated in order to utilize efficiently the heating time. This air gap or space between the gear and loop is of the order of .010 inch. The profile, therefore, of the loop must conform closely to that of the flanks of a gear tooth. The loops are expansive and their wall thickness is relatively thin so that every precaution must be taken to prevent damage of the walls. Since the air gap between the gear tooth and the loop is small, means must be provided for accurately positioning the gear tooth before it is advanced into the loop. The gear must be retained in proper position during the induction heating and during its withdrawal from the loop until the sweep of the teeth is clear of the loop. It is particularly important that the tooth be clear of the loop before the indexing operation in order to prevent damage to the loop. Further, it is also important during the withdrawal of the gear from the loop that the gear be securely locked because preferably the quenching is started just prior to the interruption of the induction circuit. If the gear is not securely locked, the force of the impinging liquid is sufficient to move the gear against the loop, thus causing violent arcing. The arcing produces craters in the gear and often punctures the thin walled loop. Another important consideration is the rotational velocity of the gear flank which must be reasonably slow so as to prevent overindexing from tooth to tooth which would foul the work locating means and damage the induction loop.

In the conventional devices, indexing of gear teeth is started before the gear tooth is withdrawn, clear of the loop. On gears having relatively large teeth, the induction loop is frequently damaged. Further, when hardening gears of relatively large diameter, it is necessary to modify the pawl assembly in order to obtain proper indexing.

The conventional devices also use only a single fluid means for developing the hydraulic force for all movements. Since the indexing movement is slow to prevent over-indexing, the speed of the complete cycle is correspondingly retarded.

Accordingly, it is a primary object of the invention to provide an induction-hardening device for accurately positioning the gear tooth before it is advanced between the loop, retaining the tooth in proper position during induction heating and during its withdrawal from the loop until the sweep of the teeth is clear of the loop, and indexing the gear for heat-treating the next successive tooth.

It is a further object of the invention to provide an improved means for heat-treating the gear teeth.

It is another object to provide improved gear-tooth heat-treating device in which a large number of types and sizes of gears may be readily accommodated.

It is a further object to provide a device of the character indicated in which the heat-treating time can be kept to a minimum.

Other objects and various further features of the invention will be pointed out or will occur to those skilled in the art from a reading of the following specification in conjunction with the accompanying drawings. In said drawings, which show, for illustrative purposes only, a preferred form of the invention:

FIG. 1 is a plan view of a heat-treating device incorporating features of the invention and shown in the position in which a gear (partly broken away to reveal construction details) is held in position for heat-treating one tooth thereof;

FIG. 2 is a longitudinal side elevation of the device of FIG. 1; and

Figure 3:
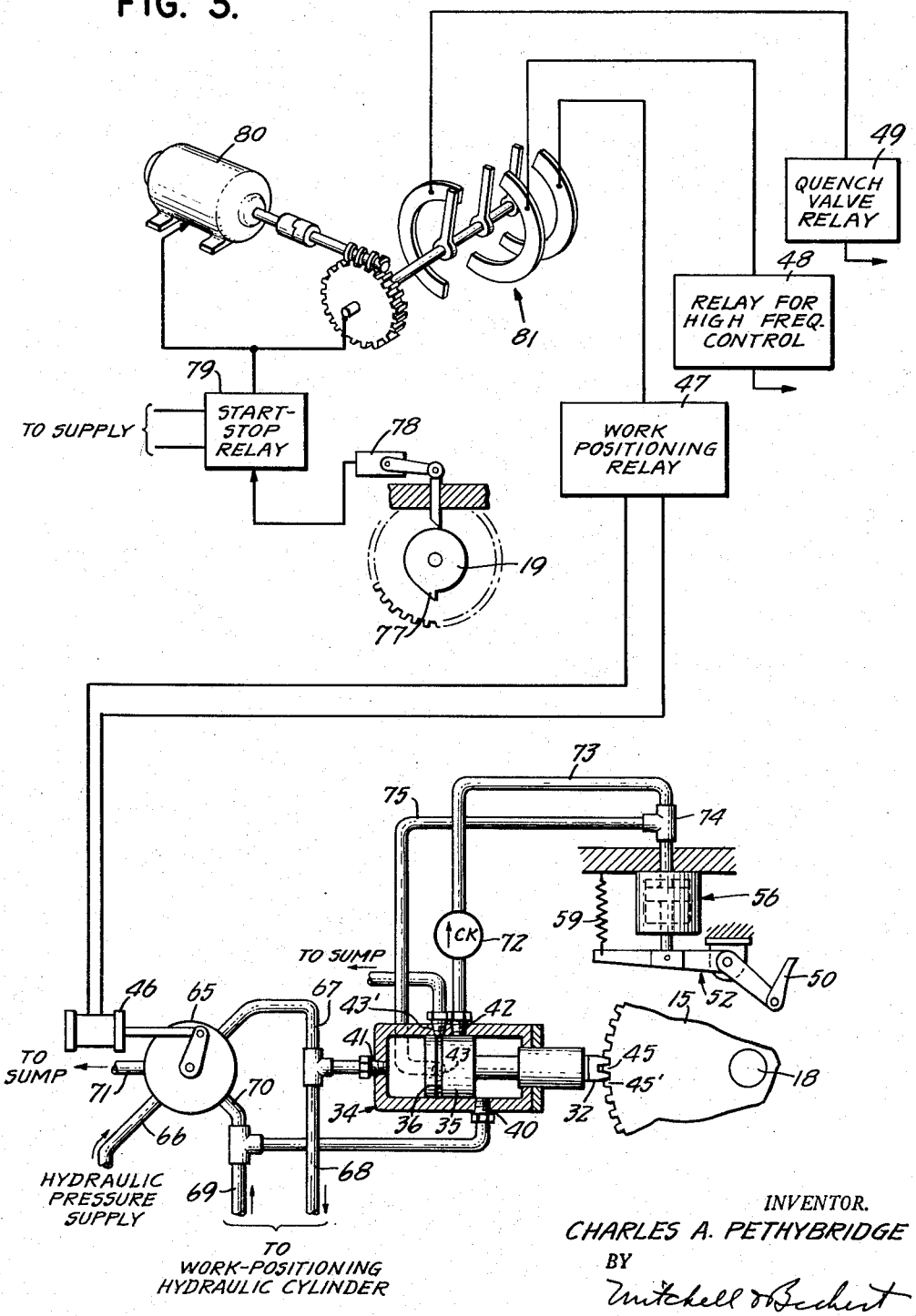
FIG. 3 is a diagram schematically illustrating electrical and mechanical parts of my invention.

Briefly stated, my invention contemplates a separate fluid actuated cylinder for indexing which is automatically controlled to index the gear after it is withdrawn clear of the loop. The stroke of the piston is regulated and the pawl is designed to permit hardening of the teeth of much larger gears with a wider range of pitches or gear tooth sizes. Further, in order to prevent quenching before the gear is clear of the loop, a separate fluid cylinder is provided and timed to withdraw the gear locator only after the gear is completely clear of the loop; this cylinder is inter-connected with the indexing cylinder so that indexing cannot occur until the gear locator is completely withdrawn. Further, the fluid cylinder for the gear locator is so timed in the cycle that the gear is locked in position before a new gear tooth is presented to the induction loop.

Referring to the drawings, my invention is shown in application to heat-treating apparatus including a heating element 10 supported on a bracket 11 forming part of the output transformer (a part of the high-frequency induction-heating means), supported on a frame 12. The element 10 may be of copper tubing and so formed with parallel stretches 13—14 as to constitute a single loop or turn comprising the output circuit of high-frequency induction-heating means (not shown in further detail). The two opposed stretches 13—14 are supported and spaced in a manner appropriate to fit in the spaces between adjacent teeth of a gear 15 to be treated and in particular to straddle the tooth 16 thereof. The heat-treating means may further include a quenching device, such as the head 25, supplied by means 26 and so controlled as to discharge a drenching spray over the heat-treated area in the vicinity of tooth 16, under control of means to be later described. The gear 15 is supported on gear-supporting means 17 including a spindle 18 and a base or hub 19.

In order that the gear tooth under treatment be brought to the hardening temperature as quickly as possible, it is important that the loop be designed and spaced as close as practically possible to the gear tooth. For example, an air gap of .010 inch between the flank of the gear tooth and the adjacent wall of the loop is satisfactory. Thus, the adjacent sides of the loop must conform closely to that of the flanks of the gear tooth.

The gear-supporting means 17 and the heat-treating supporting means 12 are relatively reciprocable as determined by guide means 20—21 on the members 17—12, respectively, and feed means includes fluid-pressure means 22 determining feeding and retracting movements of the gear and heat-treating element with respect to each other. In the form shown, the fluid-pressure means 22 is secured to the frame 12 and comprises a double-acting cylinder having a piston with a stem 23 secured to a feed bracket 24 on the gear support 17.

In accordance with the invention, I provide novel positive gear-locating means and gear-indexing means, all carried by the gear support and coordinated with the feed cycle of means 22 in order to assure positive indexing of the gear 15 in the heat-treating cycle and to minimize the periods during which heat is not applied. The novel locating and indexing means is shown carried by a single assembly 30 secured at 31 to the gear support 17. The work locator comprises a tooth-engaging member 32 carried at the end of the stem 33 of a double-acting fluid-pressure means 34.

The piston 35 of said fluid-pressure means may include a circumferential groove 36, defining a manifold which interconnects two angularly spaced ports 43—43' only when piston 35 is in the full-forward position; for all other piston positions, communication between ports 43—43' is blocked by piston 35. The cylinder may be provided with a tail port 40 for receiving fluid pressure used to determine a retracting stroke of the fitting 32 and a head port 41 for receiving fluid pressure when feeding the fitting 32 into the position shown in FIG. 1. A further intermediate port 42 is normally covered by piston 35 when in the forward position and uncovered and exposed to the tail end 38 when in the retracted position.

The tooth-locator fitting 32 may be angularly adjustable within the stem 33 so as to straddle a tooth 45, as for the case of treating a gear having an even number of teeth as shown at 15, and the formation of fitting 32 may be such that when oriented at right angles to the position shown, it may, instead of straddling the tooth 45, fit into the space between adjacent teeth so as to accommodate a gear with an odd number of teeth, all as described in greater detail in said Gridley patent.

The gear-indexing means may, as indicated above, be carried by the same assembly 30 as the gear-locating means, and in the form shown, this mechanism comprises a pawl 50 pivoted at 51 at the end of one arm of a bellcrank or lever 52, the bellcrank 52 being pivoted at 53 to the base 30. A spring 54 normally urges pawl 50 into engagement with gear teeth, and an adjustable stop 55 cooperates between the ends of lever 52 and pawl 50 to determine a limit of spring-urged movement. The means for actuating the bellcrank 52 may be a single-acting fluid-pressure-operated device as contained within the cylinder 56, also mounted on the base 30 and having a stem 57 pinned at 58 to the bellcrank 52. A spring 59 is shown normally urging the bellcrank against an adjustable stop 62, and, upon admission of pressure fluid to cylinder 56, the bellcrank 52 and pawl 50 are rocked counterclockwise to the position shown in dashed outlines 60—61. Further stop means 63 carried by the bellcrank 52 and coacting with an abutment 64 on cylinder 39 may determine a limit of rocking action of the bellcrank 52. It will be understood that by appropriately setting the stop 62 and the stop 55, the movement of the tip of pawl 50 may be caused to determine a one-tooth index of the gear 15.

The coaction of the described parts may be better understood by reference to FIG. 3 wherein a four-way control valve 65 is shown to have two positions determined by solenoid means 46. In the position shown, pressure fluid from a supply line 66 is connected to an outlet line 67 directly supplying the head inlet 41 for the locating means 32 and the head inlet 68 for the feed means 22. In said position, the tail line 69 of feed means 22, and the tail line 40 of locating means 34 are both connected via line 70 to sump line 71. It will be understood that on actuation of the solenoid 46 from the position shown to the other possible position of valve means 65, the connections will be reversed, so that pressure fluid is supplied to lines 40—69—70, and lines 41—67—68 are connected to the sump.

In addition to the described connections, port 42 of the locating means 34 is connected by way of a check-valve 72 and line 73 to the driving end of the indexing actuator 56, and a T-connection 74 provides an additional connection in line 75 to the port 43. The port 43' is connected to exhaust to the sump.

All operations are shown timed by contactors 81 driven by a motor 80. The contactors control separate relays including the work-positioning relay 47. When relay 47 actuates solenoid 46 to throw valve 65 to the position shown, feeding pressures are delivered simultaneously to the head ends of feed means 22 and 34. This action assures immediate engagement of a tooth 45 by the means 32 and the placement of the gear tooth 16 between the heat-treating members 13—14. The relay 48 for the high-frequency control may have been simultaneously energized and maintained closed for such length of time as necessary to determine the required heat treatment. Upon or preferably just prior to completion of the heat treatment, determined by relay 48, a further relay 49 may initiate quench flooding of the heated area, and this step is maintained even during withdrawal and indexing of the gear. Upon completion of heat treatment determined by relay 48, the work-positioning relay 47 is effective to shift valve means 65 to its other position, at which time retracting pressures are applied to feed means 22 and to feed means 34, resulting in withdrawal of the gear support 17 by an amount sufficient to cause the gear to clear the heat-treating elements 13—14.

After the gear is completely clear of the loop, the locating means 32 is withdrawn from locating engagement with the gear, and as soon as port 42 is cleared, an indexing movement is imparted to the pawl 50. The retraction of the locating means 32 is delayed relative to the gear support 17 by the port 40 being a bleed fitting. The restriction is selected to introduce sufficient delay to permit the gear to be free of the loop before the locator is withdrawn. The indexing movement cannot occur therefore until the locating means 32 is completely withdrawn. In the retracted position of piston 35, port 43 no longer straddles the manifold groove 36, and therefore, full assurance may be had of positive indexing thrust imparted to the pawl 50. This position may be held indefinitely, but preferably is of short duration in order to save time between heat cycles. Accordingly, the work-positioning relay 47 is again actuated to shift the position of valve 65 and to feed locator 32 into engagement with the next tooth 45' of gear 15, while work at the next tooth 16' is positioned for heat treatment.

It will be noted that, since port 43 was wholly blocked by piston 35 throughout the period of retraction of locator 32, pawl 50 was positively and continuously held in engagement with a gear tooth in the position 61, and further that the spring 54 served to hold the gear 15, thus assuring non-fouling engagement of locator 32 with tooth 45' and of heat-treating means 13—14 with tooth 16'. Of course, when piston 35 achieves its full-forward position, with the gear 15 solidly located by means 32, the port 43 again straddles the manifold groove 36 and an exhaust path is opened via port 43' for release of pressure in cylinder 56 to allow spring 59 to move bellcrank 52 to the position shown in solid lines in FIG. 1, in readiness for the next cycle of indexing operation. The check valve 72 serves the function of preventing premature release of pressure at cylinder 56 when port 40 is connected to the sump, so that pawl 50 is returned to its normal position only after the gear tooth has been solidly located.

The described cycle of treating successive teeth will be repeated automatically for successive teeth until a determination is made that the full gear has been treated. This may be readily determined by cam means 77 formed as a part of the hub 19 of the spindle 18 coacting with trip means; the trip may include an electric switch 78 in controlling relation with a start-stop relay 79 for the timer motor 80.

It will be seen that I have described an improved mechanism for automatically processing gear teeth in quick and efficient succession. There are no lost-motion connections in any of the parts subjected to feeding cycles, and strict control of gear location is maintained at all times, even during indexing and while the tooth locator is removed from engagement with the gear.

While I have described the invention in detail for the preferred form shown, it will be understood that modifications may be made within the scope of the invention as defined in the claims which follow.

I claim:

1. In a heat-treating device of the character indicated, a frame, gear-supporting means longitudinally slidable with respect to said frame, work-positioning means including a double-acting fluid-pressure-operated means reacting between said gear-supporting means and said frame, gear-locating means including second fluid-pressure-operated means carried by said gear-supporting means and including a retractably positionable element for direct locating abutment with a tooth of a gear supported by said gear-supporting means, gear-tooth indexing means carried by said gear-supporting means, and including a pawl having one-way engagement with successive teeth of the gear for each cycle of said gear-indexing means, third fluid-pressure actuating means for said pawl, said second fluid-pressure means including means responsive to achievement of a retracted displacement thereof and in actuating relation with said third fluid-pressure means, whereby said gear-tooth indexing means may be actuated immediately upon retraction of said gear-locating element and parallel fluid-supply connections to said first-mentioned fluid-pressure means and to said second fluid-pressure means.

2. In a heat-treating device, a heat-treating support including a heat-treating element to fit between adjacent teeth of a gear to be treated, a gear support including a spindle to receive a gear to be treated, guide means coacting with said supports, direct-acting feed means for reciprocating one of said supports relatively to the other of said supports along said guide means, whereby said heat-treating means and the gear may be longitudinally reciprocated to place said element between adjacent gear teeth and then to remove the same from such position, gear-locating means independent of said feed means and carried by said gear support and including a locating element retractably positionable in locating abutment with a gear tooth, gear-indexing means carried by said gear support and including a pawl having one-way engagement with successive teeth of the gear for each cycle of said gear-indexing means, means for actuating said gear-locating means in unison with actuation of said feed means, and fluid-pressure-operated means for actuating said gear-indexing means upon attainment of a retracted position of said locating element and of said feed means.

3. A device according to claim 2, in which said feed means is fluid-pressure actuated and in which said gear-locating means is fluid-pressure actuated, the fluid-pressure connections for retracting strokes of both said fluid-pressure-actuated means being the same.

4. A device according to claim 2, in which said feed means is fluid-pressure actuated and in which said gear-locating means is fluid-pressure actuated, the fluid-pressure connections for feeding the strokes of both said fluid-pressure-actuated means being the same.

5. In a heat-treating device, a heat-treating support including a heat-treating element to fit between adjacent teeth of a gear to be treated, a gear support including a spindle to receive a gear to be treated, guide means coacting with said supports, fluid-pressure operated feeds means for reciprocating one of said supports relatively to the other of said supports along said guide means, whereby said heat-treating means and the gear may be longitudinally reciprocated to place said element between adjacent gear teeth and then to remove the same from such position, double-acting fluid-pressure-actuated gear-locating means carried by said gear support and including a locating element retractably positionable in locating abutment with a gear tooth, gear-indexing means carried by said gear support, the fluid-pressure-actuated means for said gear-locating means comprising slidable piston and cylinder members, one of said members being connected to said locating element, fluid-supply means connected to said cylinder member at a location determining a retracting stroke of said locating element upon admission of pressure fluid at said location, said cylinder member having a port covered by said piston member when said locating element is projected for gear-tooth engagement but uncovered and therefore exposed to pressure fluid when said locating element is in the retracted position, and a pressure-operated connection from said port to said gear-indexing means.

6. A device according to claim 5, in which said piston member includes circumferentially extending manifold means between the head and tail ends thereof, said gear-indexing means being fluid-pressure operated, said cylinder member having two further ports communicating with said manifold means when said piston is in the forward or gear-locating position, and a connection from one of said further ports to said gear-indexing means.

References Cited in the file of this patent
UNITED STATES PATENTS

| | | |
|---|---|---|
| 1,768,159 | Shorter et al. | June 24, 1930 |
| 2,102,040 | Slade | Dec. 14, 1937 |
| 2,199,313 | Holler et al. | Apr. 30, 1940 |
| 2,504,685 | Hess et al. | Apr. 18, 1950 |
| 2,521,699 | Denneen et al. | Sept. 12, 1950 |
| 2,524,044 | Denneen et al. | Oct. 3, 1950 |
| 2,582,929 | Gridley | Jan. 15, 1952 |